(12) United States Patent
Bhattacharya et al.

(10) Patent No.: US 9,430,360 B2
(45) Date of Patent: Aug. 30, 2016

(54) SYSTEM AND METHOD FOR AUTOMATICALLY TESTING PERFORMANCE OF HIGH-VOLUME WEB NAVIGATION TREE SERVICES

(71) Applicants: Sourav Sam Bhattacharya, Fountain Hills, AZ (US); Mohammed Asharaf, Bellevue, WA (US)

(72) Inventors: Sourav Sam Bhattacharya, Fountain Hills, AZ (US); Mohammed Asharaf, Bellevue, WA (US)

(73) Assignee: WIPRO LIMITED, Bangalore (IN)

( * ) Notice: Subject to any disclaimer, the term of this patent is extended or adjusted under 35 U.S.C. 154(b) by 377 days.

(21) Appl. No.: 14/175,114

(22) Filed: Feb. 7, 2014

(65) Prior Publication Data

US 2015/0227453 A1  Aug. 13, 2015

(51) Int. Cl.
*G06F 11/36* (2006.01)
*G06F 17/30* (2006.01)
*G06F 11/34* (2006.01)

(52) U.S. Cl.
CPC ........... *G06F 11/3684* (2013.01); *G06F 11/34* (2013.01); *G06F 17/30958* (2013.01)

(58) Field of Classification Search
CPC ............... G06F 11/3684; G06F 11/34; G06F 17/30958
See application file for complete search history.

(56) References Cited

U.S. PATENT DOCUMENTS

| | | | |
|---|---|---|---|
| 5,881,243 A | * | 3/1999 | Zaumen .................. H04L 45/00 370/238 |
| 7,765,500 B2 | | 7/2010 | Hakura et al. |
| 8,055,493 B2 | | 11/2011 | Rolia et al. |
| 9,021,448 B1 | * | 4/2015 | Gagliardi .................. G06F 8/70 717/128 |
| 2005/0108057 A1 | * | 5/2005 | Cohen ................. G06F 19/3468 705/3 |
| 2010/0162216 A1 | | 6/2010 | Bell, Jr. et al. |
| 2012/0253733 A1 | | 10/2012 | Gawande et al. |
| 2013/0185433 A1 | | 7/2013 | Zhu et al. |
| 2015/0046227 A1 | * | 2/2015 | Asadi ................... G06Q 10/087 705/7.36 |

FOREIGN PATENT DOCUMENTS

GB  2488631  9/2012

OTHER PUBLICATIONS

Dubois, "11 Best Web Analytics Tools," Inc., http://www.inc.com/guides/12/2010/11-best-web-analytics-tools.html (last updated Dec. 31, 2010).

* cited by examiner

*Primary Examiner* — Andrew Lai
*Assistant Examiner* — Chuong M Nguyen
(74) *Attorney, Agent, or Firm* — Finnegan, Henderson, Farabow, Garrett & Dunner, L.L.P.

(57) ABSTRACT

The present disclosure relates to methods and systems for testing navigation graph services. Embodiments of the present disclosure may provide a directed graph based on a navigation graph service, determine a set of paths between nodes in the directed graph, and generate a testing script for an arbitrary performance testing tool based on the determined set of paths. The set of paths may comprise edge-disjoint paths between nodes in the directed graph.

22 Claims, 7 Drawing Sheets

SYSTEM AND METHOD FOR AUTOMATICALLY TESTING PERFORMANCE OF HIGH-VOLUME WEB NAVIGATION TREE SERVICES

Advances in mobile technology platforms and Internet protocols have encouraged many organizations to move their transactions into the digital space. For example, retailers of all sizes are increasingly reliant on websites and digital applications not only as a promotional advertising medium, but as a means to sell their products and/or services, negotiate pricing and support arrangements, receive and respond to customer feedback and requests, and collect data about usage patterns and trends. Government agencies are also turning to digital technologies in order to increase access to public services (such as obtaining licenses and permits, signing up for social services, payment of government fees and fines, filing and transmission of official documents, etc.) and to interact with constituents. Thus, it is not surprising that websites and digital applications have become an important gateway between transacting parties, and, in many circumstances, provide the only means by which transacting parties may communicate.

A prevalent design motif in providing these communication services is the use of navigation graphs. Many retail websites, for example, operate on a "hub and spoke" navigation graph model in which the "homepage" of the website serves as the "hub" to other parts of the website, e.g., a "FAQs" page providing answers to frequently asked questions, a "Help" page that permits a visitor to the website to seek technical assistance, an "About Us" page that describes the retailer's business and/or mission, and a "Shop" page that may list items or services offered by the retailer. The "FAQs," "Help," "About Us," and "Shop" pages (or webpages) represent "spokes" that may be accessed using links (e.g., URL addresses) off the retailer's homepage.

A hub-and-spoke model exemplifies only one type of navigation graph. Thus, to continue the foregoing example, the "Shop" page may link to a "Log In" page that permits a user to access his or her own secure account with the retailer. The "Log In" page may provide access to additional services, such as a "Preferences" page that allows a user to indicate certain preferences (e.g., a desire to receive promotional materials or news updates from the retailer by e-mail), and a "Cart" page that lists items and/or services that the user has currently selected for purchase. Generically, any page in a website may link to any other page—most websites, though, use a homepage as a central launch point to other parts of the website.

The use of navigation graphs as an organizing principle for providing services has also spread to applications, particularly mobile applications. Because mobile devices are constrained by smaller displays and less precise input sources (e.g., touchscreens, voice recognition, etc.), mobile applications have become popular as compared to mobile websites due to the former's increased usability and aesthetics. When initially loaded or accessed, an application may present a main "view" to a user, from which the user may access other application functionalities. The functionalities may be presented using additional views. Views of an application (or "app") may correspond to pages in an existing website, and vice versa. For example, analogous to the "Log In" page discussed above, an application may provide a graphical element, such as a button, in its main view display; when the button is pressed by a user, the application then changes to a "Log In" view that asks for the user's identification and password.

Websites and applications may be described as elements of navigation graph services where the underlying functionalities, e.g., providing a webpage to a user, displaying an application view to a user, creating an account for a user, authenticating a user, confirming a purchase made by the user, etc., are modularized. Besides organizing and presenting these functionalities to a user in an intuitive and interactive fashion, navigation graph services may also seamlessly integrate local (client-side) resources (e.g., receiving input from the user, presenting information to a user, determining the user's location, etc.) and remote (server-side) resources (accessing the user's financial records, validating information with a third-party, recalling the user's preferences, etc.). Thus, navigation graph services may comprise both server-side functionalities (e.g., transmitting a webpage) and client-side functionalities (e.g., displaying a webpage to a user). Certain navigation graph services may comprise one or more websites and/or one or more applications that provide the same or similar functionalities.

The performance of a navigation graph service can suffer when too many users or visitors access the service at the same time. For example, it is not uncommon for websites to crash because the server responsible for handling user requests (e.g., a request for a particular webpage) is receiving too many simultaneous requests. This vulnerability can be exploited in malicious distributed denial of service (DDoS) attacks that seek to disable websites. But even in completely benign settings, such as when retailers are providing promotional discounts to their customers or new products or services are being introduced, high user demand or a large number of visitors can render a navigation graph service unusable simply because the underlying information technology infrastructure cannot handle the number of concurrent requests that must be processed to provide the user or visitor with the appropriate server resource. Moreover, even when overall user demand for a navigation graph service can theoretically be met by the available infrastructure, imbalances in the demand for different parts of the navigation graph service (e.g., the "Log In" page of a website) can render other parts of the navigation graph service (e.g., the "Shop" page of the website) inaccessible.

To address these problems, it is often necessary to undertake performance testing of a navigation graph service prior to making the navigation graph service available to the public. Several performance testing tools are currently available, such as JMeter™ and NeoLoad. These testing tools are capable of simulating user traffic or demand for a particular server-side resource. Performance testing tools are complemented by analytical tools (e.g., so-called "web analytics"), which can provide logs of user activity, such as a number of visits to a particular webpage, or the number of requests for a particular server-side resource. Analytical tools can also help build a model of a traffic behavior in a navigation graph service, which may help to determine which parts of the navigation graph service are accessed more frequently than others.

Performance testing of a navigation graph service currently requires a human tester to develop a testing plan based on data gathered from analytical tools. The human tester then translates the testing plan into a testing script that can be executed by a performance testing tool. This process is not only labor intensive, but there is no guarantee that the testing will be "complete" due to potential errors in human judgment. Reliance on human testers makes the testing process a fundamentally heuristic one. Variations in human judgment can introduce a confounding factor that precludes meaningful comparison of results between different set of performance tests, even from the same human tester. More importantly, the labor-intensive and variable nature of performance testing make it difficult to test hypothetical "what-if" scenarios based on potential reconfigurations of the navigation graph service.

Accordingly, embodiments of the present disclosure relate to systems, methods, and non-transitory computer readable media for, among other things, testing navigation graph services that automate substantial portions of the performance testing process, help to ensure complete and thorough testing, and, by streamlining the laborious process of developing a testing plan and formulating a testing script therefrom, enable rapid testing of "what if" scenarios

SUMMARY

Certain embodiments of the present disclosure relate to a method for testing a navigation graph service comprising: providing a directed graph based on the navigation graph service, wherein nodes of the directed graph are associated with load levels; determining, by one or more hardware processors, a set of paths (S) between a root node (R) in the directed graph and other non-root nodes in the directed graph based on the load levels associated with the nodes, wherein each path in the set of paths (S) corresponds to an edge-disjoint path between R and another non-root node in the directed graph; generating, by the one or more hardware processors, a testing script for an arbitrary performance testing tool based on the set of paths (S); and executing the testing script using the performance testing tool. Determining, by one or more hardware processors, the set of paths (S) between the root node (R) and other non-root nodes in the directed graph based on the load levels associated with the nodes may comprise determining a set of edge-disjoint paths between R and another non-root node in the directed graph based the load levels associated the nodes, and assigning each path in the set of edge-disjoint paths a load level based on the load level of a node in the path having the lowest nonzero load level. For certain embodiments in accordance with the present disclosure, the set of paths (S), paths between the root node (R) and another non-root node in the directed graph in may be edge-disjoint.

In certain embodiments, determining, by one or more hardware processors, the set of paths (S) between R and other non-root nodes in the directed graph based on the load levels associated with the nodes may comprise: (a) determining a node (X) in the directed graph that is associated with the lowest nonzero and positive load level (L), wherein ties between nodes are arbitrarily resolved; determining a set of edge-disjoint paths between R and X, wherein the number of determined edge-disjoint paths is K; and (c) selecting a previously non-selected path (P) from the set of edge-disjoint paths between R and X, and adding P to the set of the paths (S), wherein the load level of each node in P is reduced by L/K. Step (c) may be repeated until K paths are added to the set of paths (S). Steps (a), (b), and (c) may be repeated until every node in the directed graph besides root node (R) has a load value of zero. In certain embodiments, each path in the set of the paths (S) may have at most N loops, wherein N may be zero or greater—N may range, for example, from 0 to 10. The method may comprise a step in which the directed graph may be validated by checking that all nodes in the directed graph are connected and that a path exists between the root node (R) and each non-root node. In certain embodiments, the navigation graph service may comprise a website, and the nodes of the directed graph may correspond to pages of the website, and/or the navigation graph service may comprise an application, and the nodes of the directed graph correspond to views of the application.

Certain embodiments of the present disclosure also relate to a system for testing a navigation graph service comprising: a memory storing instructions; and one or more hardware processors configured to execute the instructions to: provide a directed graph based on the navigation graph service, wherein nodes of the directed graph are associated with load levels; determine a set of paths (S) between a root node (R) in the directed graph and other non-root nodes in the directed graph based on the load levels associated with the nodes, wherein each path in the set of paths (S) corresponds to an edge-disjoint path between R and another non-root node in the directed graph; generate a testing script for an arbitrary performance testing tool based on the set of paths (S); and execute the testing script using the performance testing tool. The one or more hardware processors may be configured to determine the set of paths (S) between the root node (R) and other non-root nodes in the directed graph based on the load levels associated with the nodes by determining a set of edge-disjoint paths between R and another non-root node in the directed graph based the load levels associated the nodes, and assigning each path in the set of edge-disjoint paths a load level based on the load level of a node in the path having the lowest nonzero load level. For certain embodiments in accordance with the present disclosure, the set of paths (S), paths between the root node (R) and another non-root node in the directed graph in may be edge-disjoint.

In certain embodiments, the one or more hardware processors may be configured to determine the set of paths (S) between R and other non-root nodes in the directed graph based on the load levels associated with the nodes by steps comprising: (a) determining a node (X) in the directed graph that is associated with the lowest nonzero and positive load level (L), wherein ties between nodes are arbitrarily resolved; determining a set of edge-disjoint paths between R and X, wherein the number of determined edge-disjoint paths is K; and (c) selecting a previously non-selected path (P) from the set of edge-disjoint paths between R and X, and adding P to the set of the paths (S), wherein the load level of each node in P is reduced by L/K. Step (c) may be repeated until K paths are added to the set of paths (S). Steps (a), (b), and (c) may be repeated until every node in the directed graph besides root node (R) has a load value of zero. In certain embodiments, each path in the set of the paths (S) may have at most N loops, wherein N may be zero or greater—N may range, for example, from 0 to 10. The one or more hardware processors may be configured to validate the directed graph by checking that all nodes in the directed graph are connected and that a path exists between the root node (R) and each non-root node. In certain embodiments, the navigation graph service may comprise a website, and the nodes of the directed graph may correspond to pages of the website, and/or the navigation graph service may comprise an application, and the nodes of the directed graph correspond to views of the application.

Certain embodiments in accordance with the present disclosure also relate to a non-transitory computer-readable medium storing instructions for testing a navigation graph service, wherein upon execution of the instructions by one or more hardware processors, the one or more hardware processors are configured by the instructions to: provide a directed graph based on the navigation graph service, wherein nodes of the directed graph are associated with load levels; determine a set of paths (S) between a root node (R) in the directed graph and other non-root nodes in the directed graph based on the load levels associated with the nodes, wherein each path in the set of paths (S) corresponds to an edge-disjoint path between R and another non-root node in the directed graph; generate a testing script for an arbitrary performance testing tool based on the set of paths (S); and execute the testing script using the performance testing tool. The instruction may be configure the one or more hardware processors to determine the set of paths (S) between the root node (R) and other non-root nodes in the directed graph based on the load levels associated with the nodes by determining a set of edge-disjoint paths between R and another non-root node in the directed graph based the load levels associated the nodes, and assigning each path in the set of edge-disjoint paths a load level based on the load level of a node in the path having the lowest nonzero load level. For certain embodiments in accordance with the present disclosure, the set of paths (S), paths between the root node (R) and another non-root node in the directed graph in may be edge-disjoint.

In certain embodiments, the instructions may configure the one or more hardware processors to determine the set of paths (S) between R and other non-root nodes in the directed graph based on the load levels associated with the nodes by steps comprising: (a) determining a node (X) in the directed graph that is associated with the lowest nonzero and positive load level (L), wherein ties between nodes are arbitrarily resolved; determining a set of edge-disjoint paths between R and X, wherein the number of determined edge-disjoint paths is K; and (c) selecting a previously non-selected path (P) from the set of edge-disjoint paths between R and X, and adding P to the set of the paths (S), wherein the load level of each node in P is reduced by L/K. Step (c) may be repeated until K paths are added to the set of paths (S). Steps (a), (b), and (c) may be repeated until every node in the directed graph besides root node (R) has a load value of zero. In certain embodiments, each path in the set of the paths (S) may have at most N loops, wherein N may be zero or greater—N may range, for example, from 0 to 10. The instructions may configure the one or more hardware processors to validate the directed graph by checking that all nodes in the directed graph are connected and that a path exists between the root node (R) and each non-root node. In certain embodiments, the navigation graph service may comprise a website, and the nodes of the directed graph may correspond to pages of the website, and/or the navigation graph service may comprise an application, and the nodes of the directed graph correspond to views of the application.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

BRIEF DESCRIPTION OF THE DRAWINGS

The accompanying drawings, which constitute a part of this specification, illustrate several embodiments and, together with the description, serve to explain the disclosed principles. In the drawings.

DETAILED DESCRIPTION

As used herein, reference to an element by the indefinite article "a" or "an" does not exclude the possibility that more than one of the element is present, unless the context clearly requires that there is one and only one of the elements. The indefinite article "a" or "an" thus usually means "at least one." The disclosure of numerical ranges should be understood as referring to each discrete point within the range, inclusive of endpoints, unless otherwise noted.

As used herein, the terms "comprise," "comprises," "comprising," "includes," "including," "has," "having," "contains," or "containing," or any other variation thereof, are intended to cover a non-exclusive inclusion. For example, a composition, process, method, article, system, apparatus, etc. that comprises a list of elements is not necessarily limited to only those elements but may include other elements not expressly listed. The terms "consist of," "consists of," "consisting of," or any other variation thereof, excludes any element, step, or ingredient, etc., not specified. The term "consist essentially of," "consists essentially of," "consisting essentially of," or any other variation thereof, permits the inclusion of elements, steps, or ingredients, etc., not listed to the extent they do not materially affect the basic and novel characteristic(s) of the claimed subject matter.

Figure 1:
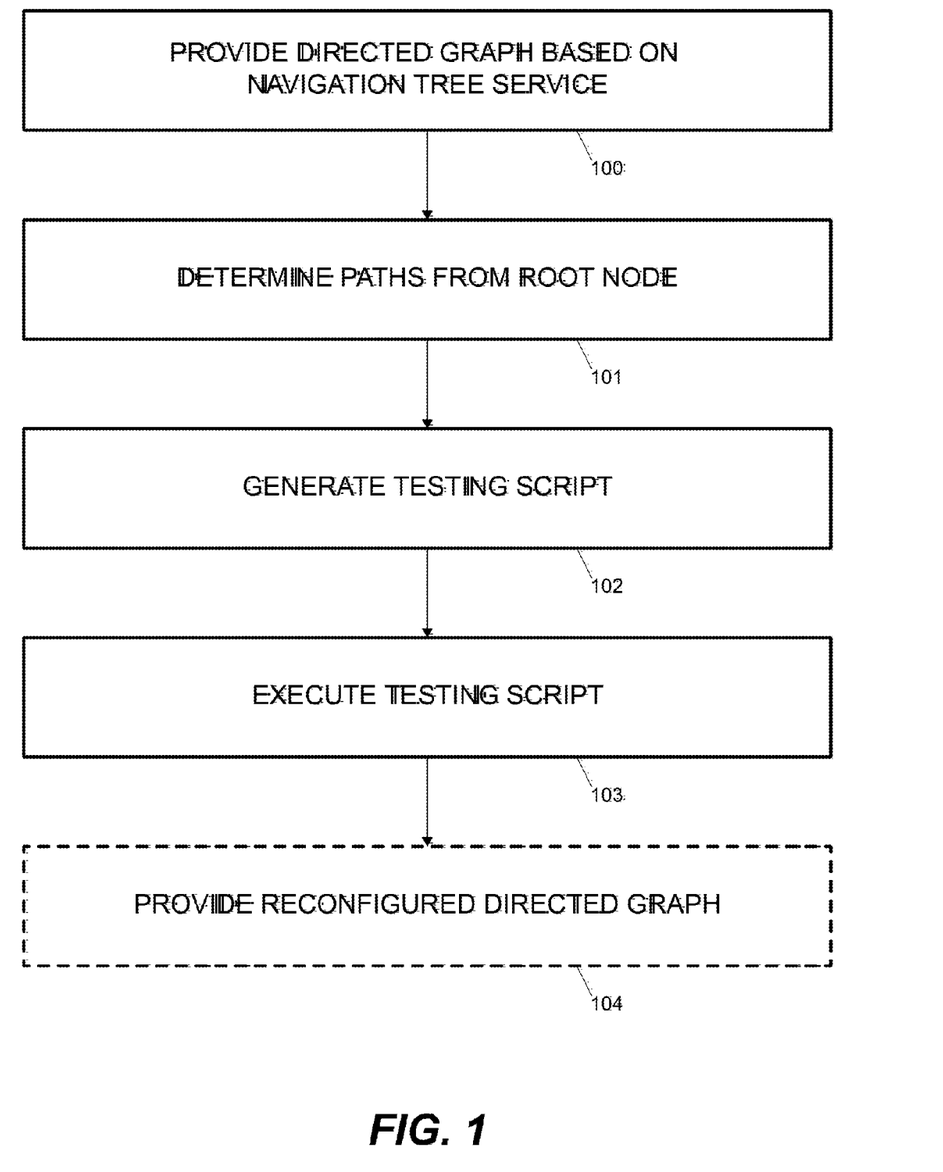
FIG. 1 is a flowchart of a method of testing a navigation graph service in accordance with certain embodiments of the present disclosure.
Figure 2:
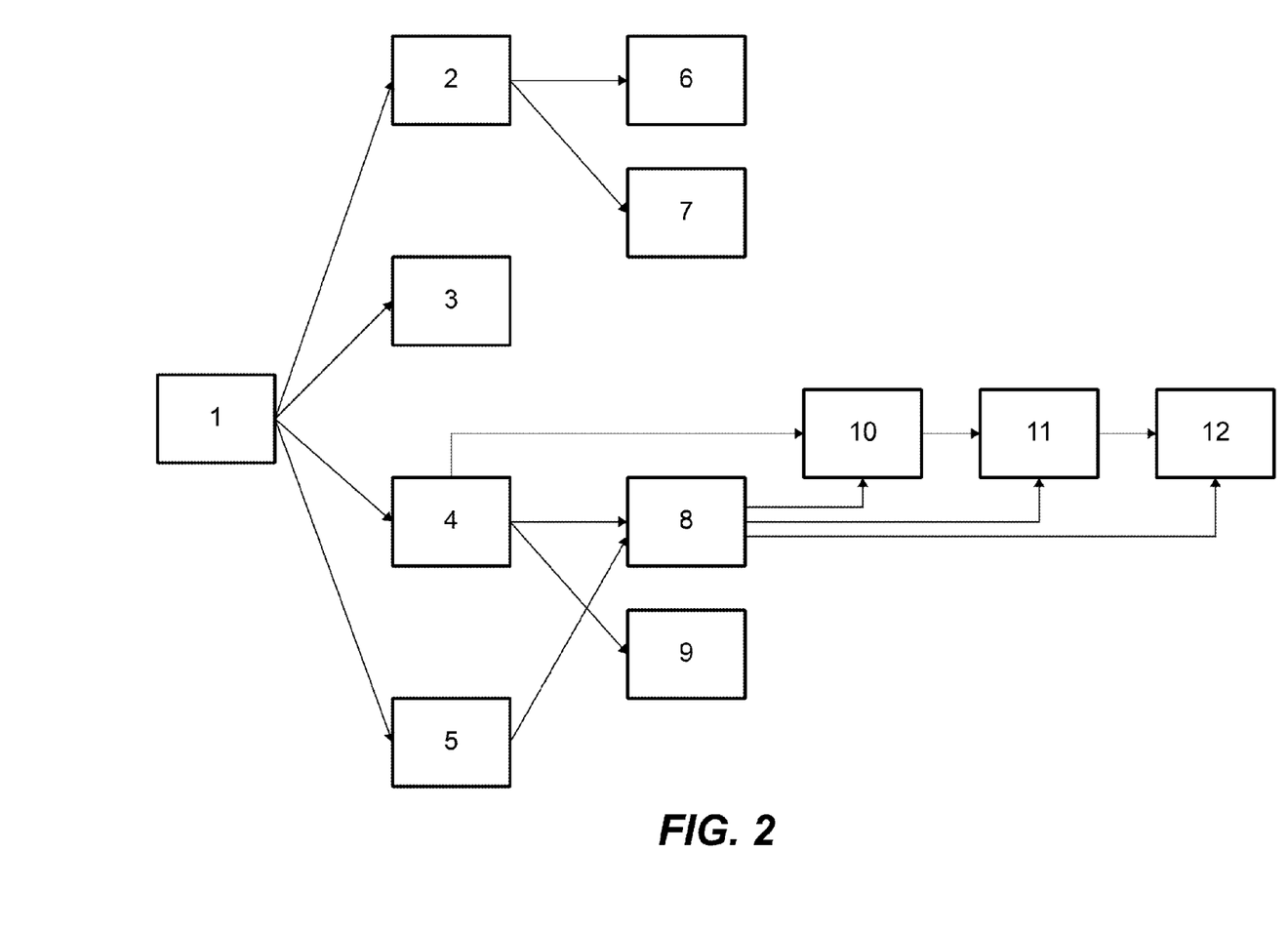
FIG. 2 illustrates a directed graph having 12 nodes and defined connectivity between the 12 nodes.

FIG. 1 is a flowchart illustrating a method in accordance with certain embodiments of the present disclosure. The method may begin in step 100 by providing a directed graph based on a navigation graph service, e.g., a website or application. A directed graph comprises a plurality of nodes and a set of connections between nodes in the graph. FIG. 2 schematically depicts a directed graph having 12 nodes (numbered for ease of identification) and defined connectivity. The directed graph of FIG. 2 may also be described using the following matrix:

$$\begin{bmatrix} 0 & 1 & 1 & 1 & 1 & 0 & 0 & 0 & 0 & 0 & 0 & 0 \\ 0 & 0 & 0 & 0 & 0 & 1 & 1 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 1 & 1 & 1 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 1 & 1 & 1 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 1 \\ 0 & 0 & 0 & 0 & 0 & 0 & 0 & 0 & 0 & 0 & 0 & 0 \end{bmatrix}$$

Each row in the foregoing matrix corresponds to a node of the directed graph shown in FIG. 2, the first (top) row corresponding to node 1, the second row corresponding to node 2, and so on until the twelfth (bottom) row corresponding to node 12. Each column also corresponds to a node of the directed graph shown in FIG. 2, the first (leftmost) column corresponding to node 1, the second column corresponding node 2, and so on until the twelfth (rightmost) column corresponding to row 12. For a given row-column coordinate in the matrix, a value of 1 indicates that the node corresponding to the row is connected to the node corresponding to the column, and value of zero indicates that there is no connection. Thus, for example, node 1 of the directed graph in FIG. 2 is connected to nodes 2, 3, 4, and 5. Accordingly, in row 1 of the foregoing matrix, columns 2, 3, 5, and 5 have the value of 1, and the remaining columns have the value of zero.

Though FIG. 2 only shows a directed graph having unidirectional connectivity, bidirectional connectivity is also permitted. For example, nodes 8 and 10 could have a bidirectional connection (e.g., a double-headed arrow between nodes 8 and 10), and the corresponding matrix representation would be:

$$\begin{bmatrix} 0 & 1 & 1 & 1 & 1 & 0 & 0 & 0 & 0 & 0 & 0 & 0 \\ 0 & 0 & 0 & 0 & 0 & 1 & 1 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 1 & 1 & 1 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 1 & 1 & 1 \\ 0 & 0 & 0 & 0 & 0 & 0 & 0 & 0 & 0 & 0 & 0 & 0 \\ 0 & 0 & 0 & 0 & 0 & 0 & 1 & 0 & 0 & 0 & 1 & 0 \\ 0 & 0 & 0 & 0 & 0 & 0 & 0 & 0 & 0 & 0 & 0 & 1 \\ 0 & 0 & 0 & 0 & 0 & 0 & 0 & 0 & 0 & 0 & 0 & 0 \end{bmatrix}$$

In the case where the navigation graph service is a website or application, nodes of the directed graph based on the navigation graph service may correspond to pages in the website or views in the application. Connectivity between nodes may be defined based on the navigation options presented to the user in the corresponding page or view. For example, in a website, a connection from page X to page Y may be established if there is link on page X to page Y. Data from analytical tools may also be used to define connectivity. For example, web analytics may show that significant portion of the traffic on page Y originates from the link on page X, thus supporting a connection between the nodes corresponding to X and Y in the directed graph. In the case of a generic navigation graph service, nodes may correspond to the modules that encapsulate discrete parts of the navigation graph service, e.g., particular functionalities of the navigation graph service, and connectivity may be defined based on either links between the modules or observation of existing traffic patterns between the modules.

Figure 3:
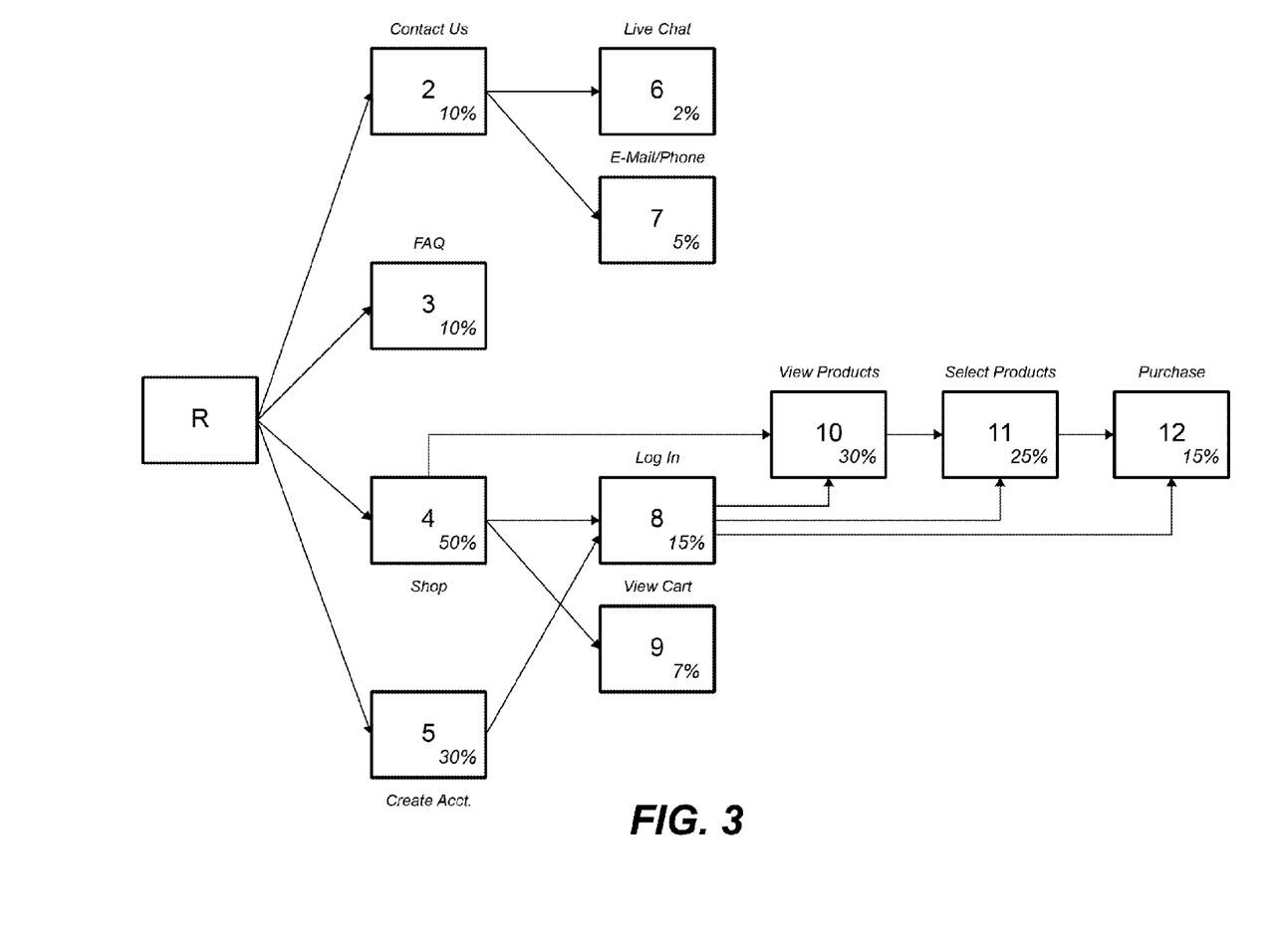
FIG. 3 illustrates a directed graph based on an exemplary navigation graph service, wherein nodes of the directed graph are associated with load levels.

FIG. 3 illustrates a directed graph based on an exemplary navigation graph service comprising a retail website operated by a retailer having 12 pages: a homepage, a "Contact Us" page providing users/visitors to the website with information on how to contact the retailer, a "FAQ" page answering frequently asked pages, a "Shop" page that permits users/visitors to access e-commerce functionalities of the website, a "Create Acct." page that allows users/visitors to create an account with a retailer, a "Live Chat" page that permits users/visitors to send and receive real-time messages to a customer support representative, an "E-Mail/Phone" page that provides users/visitors with the retailer's e-mail address and phone number, a "Log In" page that provides users/visitors access to their secure account, a "View Cart" page that allows users/visitors to view products they have selected, a "View Products" page that provides users/visitors with a listing products available for purchase, a "Select Products" page that permits users/visitors to select products for purchase, and a "Purchase" page that permits users/visitors to purchase products, e.g., by allowing users/visitors to select a payment method and confirm delivery options with the retailer. The nodes in FIG. 3 are represented by the rounded rectangles and the connections between the nodes are shown using arrows. The connectivity between the nodes in the directed graph of FIG. 3 may be defined by the hierarchy of the pages in the website. For example, the homepage of the website may have the URL address www.xyz.com, and the "Contact Us," "FAQ," "Shop," and "Create Acct." pages may therefore have URL addresses of www.xyz.com/Contact, www.xyz.com/FAQ, www.xyz.com/Shop, and www.xyz.com/Acct, respectively, and the "Live Chat" and "Email/Phone" pages may have URL addresses of www.xyz.com/Contact/Chat, and www.xyz.com/Contact/Email, respectively.

Providing a directed graph based on a navigation graph service in step 100 may comprise identifying a root node in the directed graph. In the case of navigation graph service comprising a website or application, the root node may be the node corresponding to the homepage of the website, or the main view of the application. Thus, as shown in the FIG. 3, the root node (R) corresponds to the homepage of the website. In more sophisticated navigation graph services, analytical tools may be used to determine the root node. For example, a root node may correspond to the most often requested functionality of the navigation graph service, e.g., the page of a website having the most unique visitors, or a view of an application that is most often accessed.

Providing a directed graph based on a navigation graph service in step 100 may also comprise associating nodes in the directed graph with load levels. The load level associated with a particular node may correspond to user/visitor traffic flowing to the portion of the navigation graph service represented by the node, e.g., the number of unique visitors to a webpage, or the number of requests for a particular functionality of the navigation graph service. As discussed above, load levels may be obtained using analytical tools, e.g., web analytics. In certain embodiments, load levels may be normalized, e.g., as a percentage of the overall user/visitor traffic to the navigation graph service. Normalized load levels are shown in FIG. 3 using the percentages shown in the bottom-right corner the rounded rectangles representing the nodes. Also as shown in FIG. 3, it may not be necessary to assign load level to the root node.

In certain embodiments in accordance with the present disclosure, a system may provide a directed graph based on a navigation graph service by receiving a directed graph through a graphical user interface (GUI) presented to a user. The system may present the GUI in a manner allowing the user to input a directed graph based on navigation graph service by drawing the directed graph and specifying the load levels for the nodes. The system may further present an option allowing the user to save the directed graph and/or load and edit a previously saved directed graph. The system may also perform validation of a directed graph provided by the user, for example, by ensuring that all nodes are connected and the specified load levels associated with the nodes are consistent. Validation of a directed graph may be performed, for example, each time the directed graph is saved by the user.

As shown in step 101 of FIG. 1, a method in accordance with the present disclosure may next determine paths in the directed graph starting from root node (R), for example, by determining a set of paths (S) between R and other non-root nodes in the directed graph based on the load levels associated with the nodes, wherein each path in the set of paths (S) may correspond to an edge-disjoint path between R and another non-root node. An exemplary algorithm for determining S in accordance with certain embodiments of the present disclosure begins by locating the node (X) having the lowest nonzero and positive load level (L). In certain embodiments, the algorithm may ensure that S contains no paths prior to locating X when the algorithm is executed for the first time. Using the directed graph of FIG. 3 as an example, the set of paths (S) would be initialized to an empty set, and X would correspond to node 6 having a load level (L) of 2%.

Having identified X, the algorithm may proceed by determining the set of edge-disjoint paths between R and X. Algorithms for determining the set of edge-disjoint paths between two nodes in a directed graph are known in the art, for example, the Ford—Fulkerson algorithm for determining maximum flow in a directed graph, and its Edmonds-Karp variant. In certain embodiments, determining the set of edge-disjoint paths between R and X may comprise excluding any paths containing a node having a load level of zero, for example, by running the Ford—Fulkerson algorithm to obtain a preliminary set of edge-disjoint paths, and removing any paths having nodes with load value equal to zero to obtain a final set of set of edge-disjoint paths. Paths also may be excluded based on other attributes, e.g., the number of loops that may be present in a path (e.g., at most 0 to 10 loops), the maximum length (number of nodes) in a path, etc. A path having a loop may comprise a sequence of nodes wherein the same node appears more than once in the sequence. Thus, in certain embodiments in accordance with the present disclosure, determining the set of the edge-disjoint paths between R and X may comprise determining a preliminary set of edge-disjoints paths, for example using the Ford-Fulkerson algorithm, and removing paths from the preliminary set that do satisfy the specified attributes. In the present example using the directed graph shown in FIG. 3, the set of edge-disjoint paths between R and X (node 6) contains only one path containing nodes R, 2, and 6. In certain embodiments, the specified attributes may take on variable values—for example the maximum number of loops in a path, or the maximum length or number of nodes in a path may depend on which node is determined as X. The specified attributes, either fixed or variable, may be determined by receiving a value from a graphical user interference, for example, as part of the step of providing a directed graph based on a navigation graph service in step 100.

Figure 4:
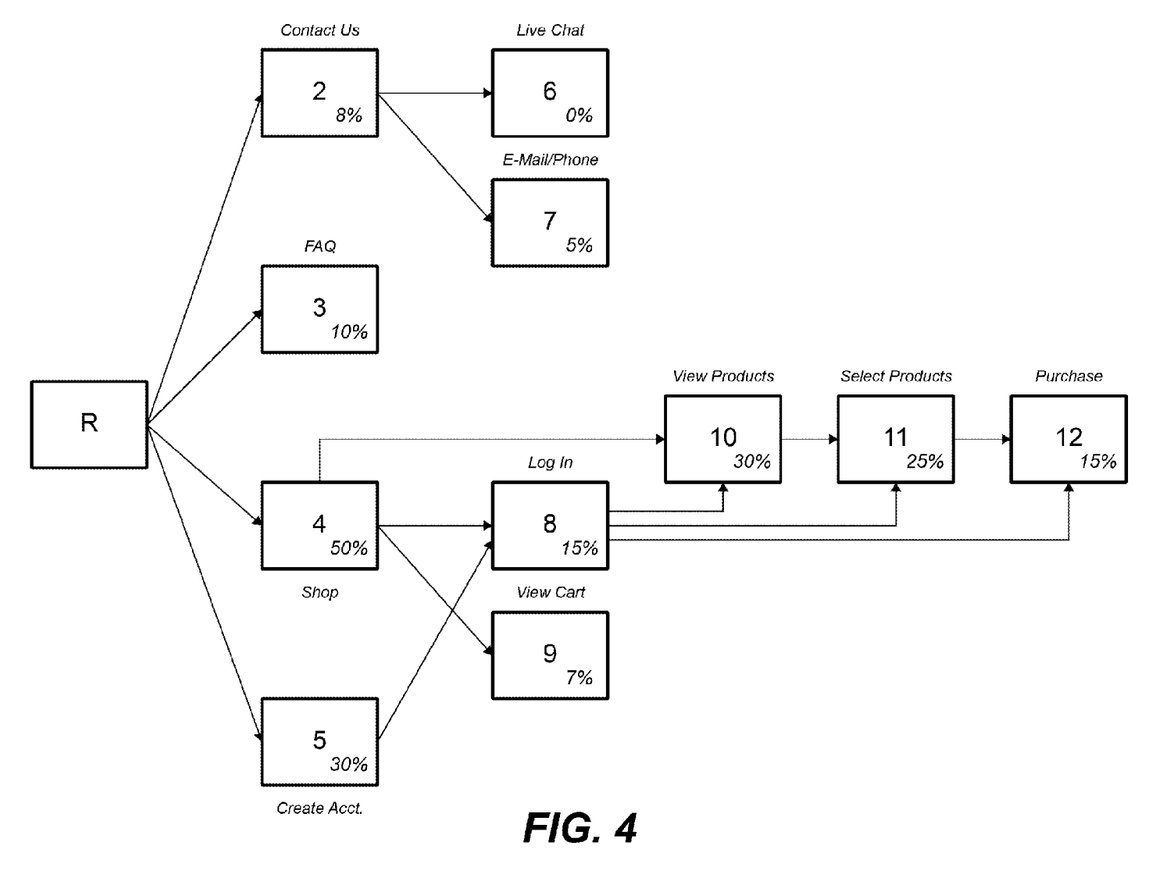
FIG. 4 illustrates the directed graph based on a navigation graph service after a partial iteration of a method in accordance with the present disclosure.

The algorithm may also include adding to S a path (P) in the set of edge-disjoint paths. When added to S, the load value of each node in P may be reduced by L divided by the number of paths in the set of the edge-disjoint paths (K). Where the quotient of L divided by K is not an integer, it may be rounded up or down to the nearest integer value. In the present example using the directed graph shown in FIG. 3, L/K=2%/1=2%, the load value of node 6 becomes zero, and the load value of node 2 becomes 10%−2%=8%. The resulting directed graph adding P to S and reducing the load level of node 2 is shown in FIG. 4. Paths in the set of paths (S) may also be assigned or associated with a load level based on the load level of a node in the path having the lowest nonzero load level. For example, in certain embodiments, P may be associated with a path load value (m)=L/K when added to S. Thus, S may be described using a set of ordered pairs $\{(P_1, m_1), (P_2, m_2), (P_3, m_3), \ldots (P_N, m_N)\}$, where N is equal to the number of paths in S. In certain embodiments, each path in the set of the edge disjoint paths may be added to S only once, for example, by selecting P from previously non-selected paths in the set of the edge-disjoint paths.

Paths in the set of paths (S) may also incorporate additional load levels between nodes in the path. These additional load levels, for example, may be based on human "click delay" between pages or a website or views of an application. These additional load levels may be variable, or may be assigned a constant value, a random value, a value based on the node or nodes upstream or downstream of a particular node in the path, or may be received from a graphical user interface, for example as part of the step of providing a directed graph based on a navigation graph service in step 100.

Similarly, paths may also incorporate balking, a phenomenon in which users of a navigation graph service may lose interest in the service and thus discontinue their use of it, A consequence of balking is that downstream nodes in a path will have lower load levels than upstream nodes in a testing scenario. Thus, a path may also be assigned one or more balking factors based on the proportion of user traffic that is diverted away from the navigation graph service between nodes. Thus for example, a constant balking factor, e.g. 98% may be assigned to a path indicating that the load level of a node in the path receives only 98% of the load of the upstream adjacent node. Multiple balking factors may also be assigned to a path, for example, a balking factor may be assigned for each pair of adjacent connected nodes in a path. Balking factors may be fixed or variable—for example balking factors assigned to a path may increase or decrease going upstream or downstream in a path (e.g. tapering).

Figure 5:
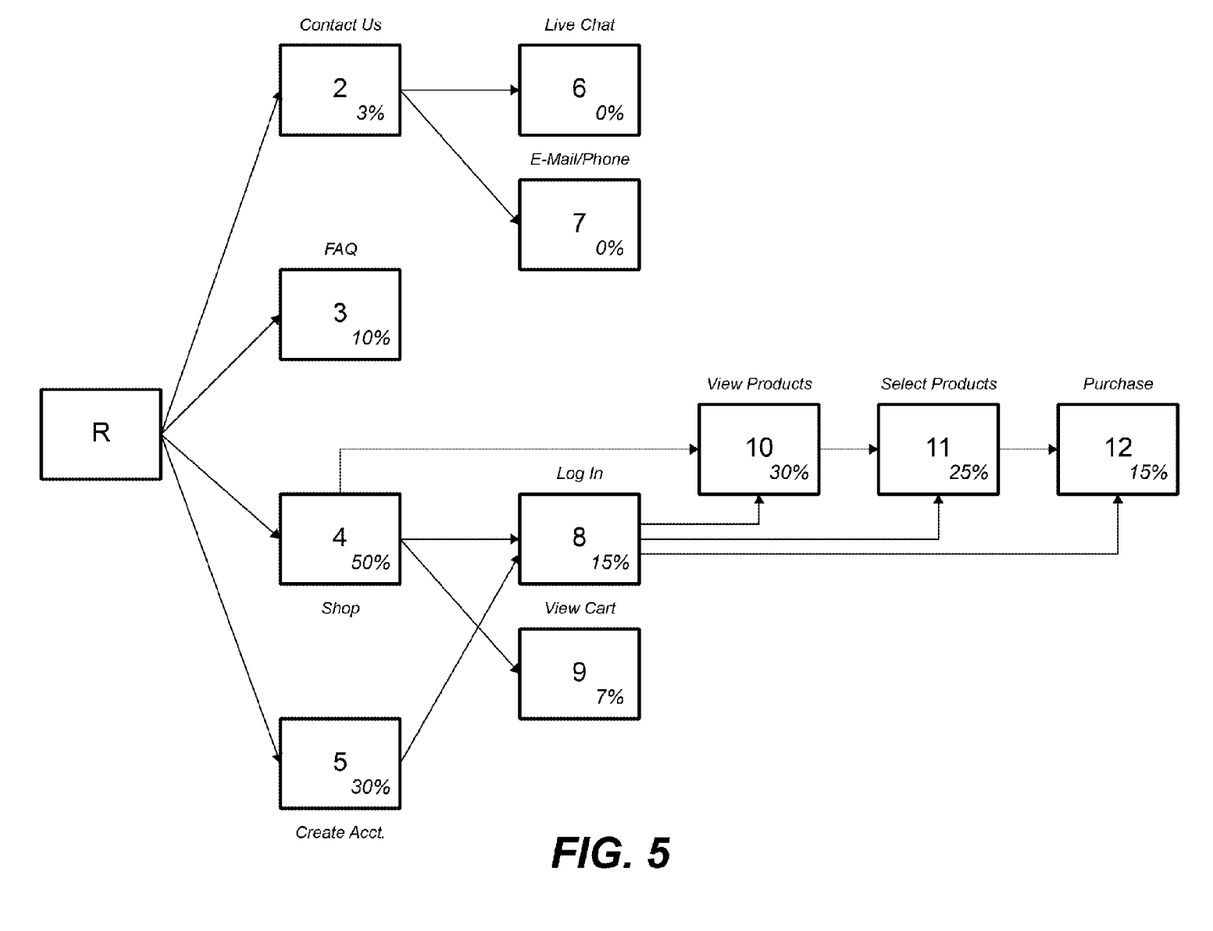
FIG. 5 illustrates the directed graph based on a navigation graph service after another partial iteration of a method in accordance with the present disclosure.

The foregoing algorithm may be repeated until a terminating condition is satisfied, for example X can longer be determined, or when all nodes have zero load level. Thus, for example, the next iteration may start with the directed graph shown in FIG. 4, identifying node 7 as X, with L=5%. Here, only one path P containing nodes R, 2, and 7 is present in the set of edge-disjoint paths between R and X (node 7). P is then added to S, and L/K=5%/1=5% is subtracted from each node in P, resulting in the directed graph shown in FIG. 5. The next iteration may therefore start with the directed graph shown in FIG. 5, identifying node 2 as X, with L=3%, etc. In this manner, the set of the paths between R and other nodes in the directed graph may be determined in step 101.

As shown in step 102 of FIG. 1, a method in accordance with the present disclosure may next include generating a testing script for an arbitrary performance testing tool based on the set of the paths (S) determined in step 101. Because the syntax of a testing script will depend on the performance testing tool, e.g., J-Meter™, NeoLoad, etc., intended to execute the testing script, generating a testing script may comprise applying a template function (T) to each path in S, wherein T may be adapted to satisfy the syntactical requirements of the particular performance testing tool to be used. In certain embodiments, the input to T may comprise a path (P) and a path load level (m) associated with P, as discussed above. The output of T(P, m) may comprise a set of set of instructions for a performance testing tool, for example, instructing the performance testing tool to make requests to parts of the navigation graph service, e.g., webpages or application views, corresponding to the nodes in P, in a manner that simulates the activity of a user or visitor. The frequency of requests may be based on the value of m. Thus, in certain embodiments in accordance with the present disclosure, generating a testing script in step 102 may comprise applying T(P, m) to each ordered pair ($P_1$, $m_1$) in S. For a given performance testing tool, generating a testing script in step 102 may also comprise an initial step of providing a blank testing script having appropriate header syntax for the particular performance testing tool, and a final step of inserting appropriate closing syntax for the performance testing tool. A testing script may be generated using all or a subset of the paths in the set of paths (S), and, in certain embodiments, a testing script may be generating for each of the paths in the set of paths (S). Generating a testing script in step 102 may also comprise receiving a selection identifying the performance testing tool that will be used to execute the testing script and using template function (T) corresponding to the selection.

As shown in step 103 in FIG. 1, a method in accordance with the present disclosure may next execute the testing script. Because different performance testing tools may have different syntactical requirements, executing the testing script may comprise using the performance testing tool capable of processing the syntax of the testing script. Executing the testing script may also comprise determining which performance tool is to be used based on the syntax of the testing script, or the presence of metadata in the testing script, e.g., header or closing syntax, that identifies the appropriate performance testing tool.

Executing the testing script in step 103 may further comprise assessing the performance of the navigation graph service during testing. Performance of the navigation graph service during execution of the testing script may be assessed using analytical tools, e.g., web analytics, that may quantify various performance-related metrics, for example, the time elapsed to process a given request made to the navigation graph service.

Figure 6:
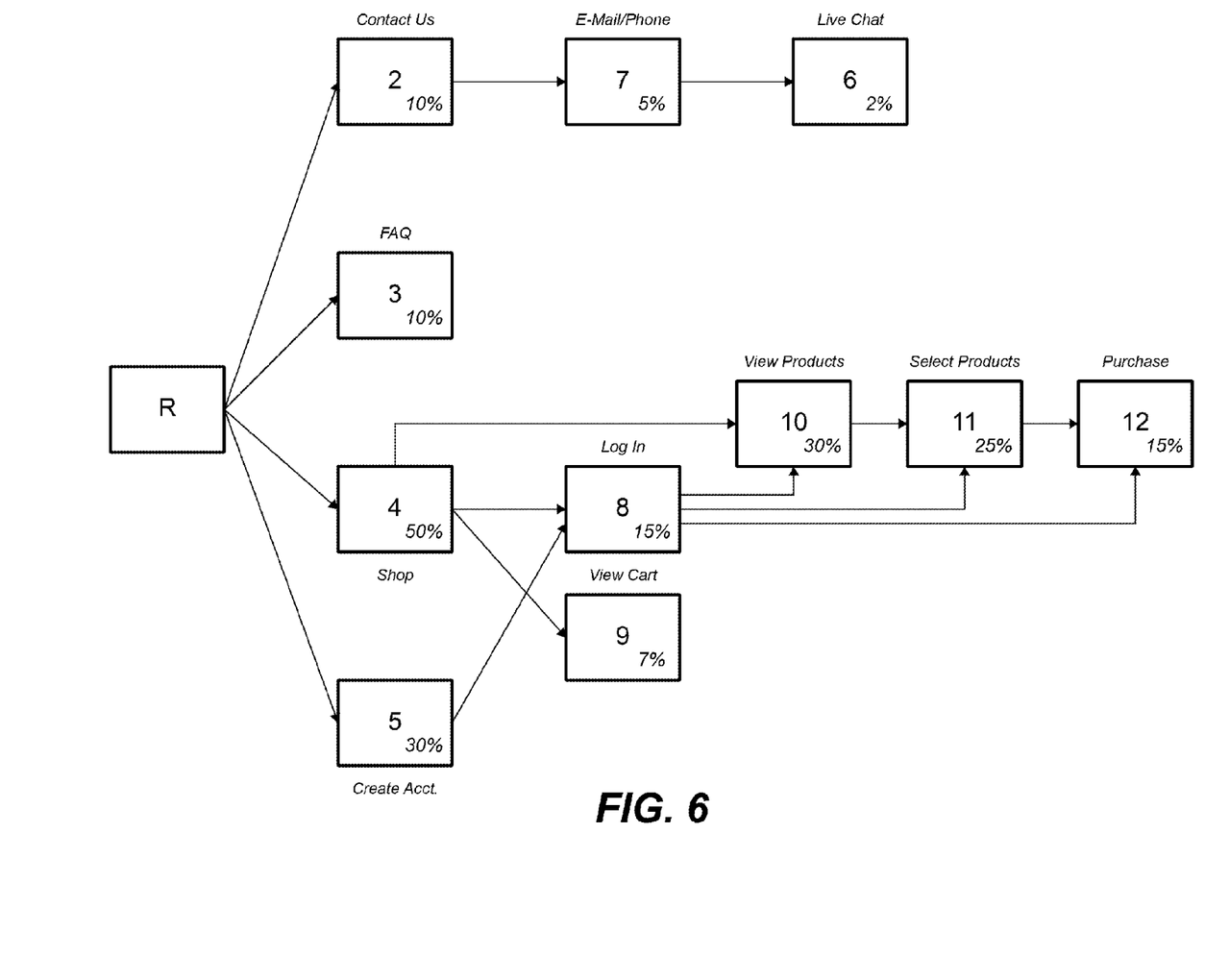
FIG. 6 illustrates a directed graph based on a reconfigured navigation graph service.

Optionally, in step 104 of FIG. 1, a method in accordance with the present disclosure may further comprise providing a reconfigured directed graph. By assessing the performance of the navigation graph service during execution of the testing script in step 103, certain changes to the navigation graph service may be suggested that could improve its performance. A reconfigured directed graph may be provided based a hypothetical reconfiguration of the navigation graph service. An example of a reconfigured directed graph is shown in FIG. 6. Comparing FIG. 3 and FIG. 6 shows that a directed graph based on the reconfigured navigation graph service has substituted the connection from node 2 to node 7, with a connection from node 6 to node 7. The method shown in FIG. 1 may then be repeated to perform rapid "what if" testing to determine if reconfiguring the navigation graph service may result in improved performance. Thus, for example, in step 100 a directed graph may be received by a system in the form of a reconfigured directed graph through the GUI discussed above, e.g., by loading a previously saved directed graph based on navigation graph service and receiving editing information for the directed graph (e.g., the directed graph shown in FIG. 3) to generate a reconfigured directed graph (e.g., the directed graph shown in FIG. 6). Steps 101 and 102 in FIG. 1 may then be repeated to determine the set of paths (S) between the root node and other non-root nodes in the reconfigured directed graph, and generate a testing script for a performance tool based on the set of paths (S). The testing script may then be executed again in step 103, and the performance of the navigation graph service may be assessed. In this manner, methods in accordance with the present disclosure may be used in an iterative fashion to improve the performance of navigation graph services.

It is also envisioned that paths in the set of paths (S) may be non-linear, e.g. multicast paths. For example, a multicast path starting from node R may be constructed, reaching more than one destination node ($X_1$, $X_2$, . . . $X_k$). Well-known graph theoretic algorithms for multicast tree extraction may to be used to determing the set of paths (S), instead of linear path finding algorithms. Once the multicast trees are identified, embodiments in accordance with the present disclosure may follow the topology of the multicast path, to model traffic from a previous intermediate node to potentially multiple successor nodes. Multicast paths may also incorporate additional load level between nodes in the path for click delay, or blaking, as discussed above.

Systems in accordance with the present disclosure may comprise one or more hardware processors and computer-readable medium storing instructions, wherein the instructions configure the one or more hardware processors to perform the methods as substantially described above and shown in FIG. 1. Non-transitory computer-readable media in accordance with the present disclosure may comprise instruction that, when executed by one or more hardware processors, configure the hardware processors to perform the methods as substantially described above and shown in FIG. 1.

Figure 7:
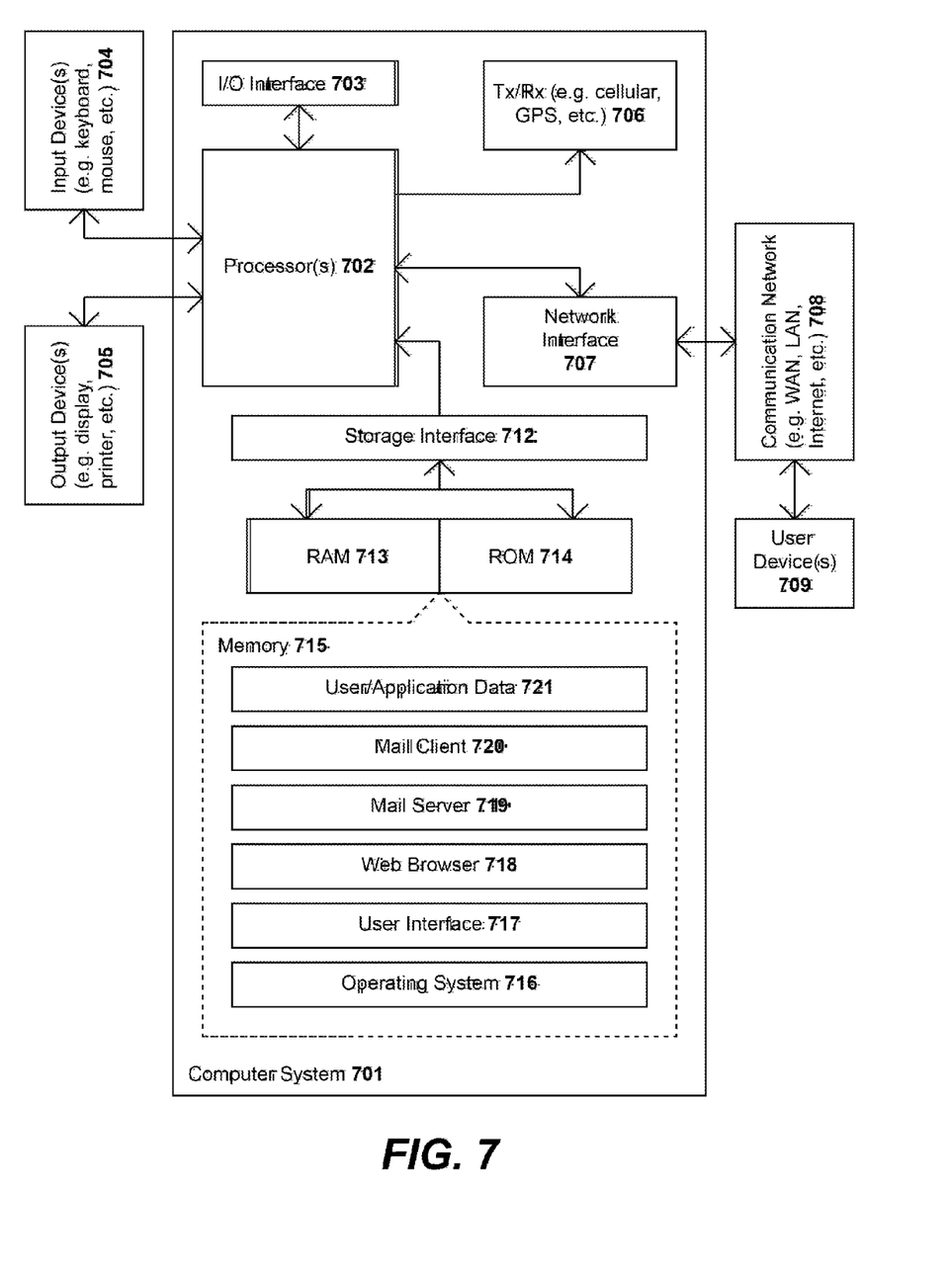
FIG. 7 is a block diagram of an exemplary computer system for implementing embodiments consistent with the present disclosure

FIG. 7 is a block diagram of an exemplary computer system for implementing embodiments consistent with the present disclosure. Variations of computer system 701 may be used for implementing any of the devices presented in this disclosure. Computer system 701 may comprise a central processing unit ("CPU" or "processor") 702. Processor 702 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for testing a navigation graph service comprising:
   providing, by one or more hardware processors, a directed graph based on the navigation graph service, wherein nodes of the directed graph are associated with load levels;
   determining, by the one or more hardware processors, a set of paths (S) between a root node (R) in the directed graph and a plurality of other non-root nodes in the directed graph based on the load levels associated with the nodes, wherein the determining comprises selecting a previously non-selected path (P) from a set of edge-disjoint paths between the R and a node X in the directed graph that is associated with a lowest non zero and a positive load level (L), and adding the P to the set of the paths (S), wherein the load level of each node in the P is reduced by L/K, wherein ties between the nodes are arbitrarily resolved, wherein the number of determined edge-disjoint paths is the K, and wherein each path in the set of paths (S) corresponds to an edge-disjoint path between the R and one of the plurality of the other non-root node in the directed graph;
   generating, by the one or more hardware processors, a testing script for an arbitrary performance testing tool based on the set of paths (S); and
   executing the testing script using the arbitrary performance testing tool.

2. The method according to claim 1, wherein the selection of P is repeated until K paths are added to the set of paths (S).

3. The method according to claim 2, wherein the step of determining the S is repeated until every node in the directed graph besides the root node (R) has a load level of zero.

4. The method according to claim 1, wherein the directed graph is validated by checking that all nodes in the directed graph are connected and that a path exists between the root node (R) and each non-root node in the plurality of the other non-root nodes.

5. The method according to claim 1, wherein the navigation graph service comprises a website, and the nodes of the directed graph correspond to pages of the website.

6. The method according to claim 1, wherein the navigation graph service comprises an application, and the nodes of the directed graph correspond to views of the application.

7. The method according to claim 1, wherein each path in the set of the paths (S) has at most N loops, wherein N ranges from 0 to 10.

8. The method according to claim 1, wherein determining, by the one or more hardware processors, the set of paths (S) between the root node (R) and the plurality of the other non-root nodes in the directed graph based on the load levels associated with the nodes comprises determining a set of edge-disjoint paths between the R and one of the plurality of the other non-root nodes in the directed graph based the load levels associated the nodes, and assigning each path in the set of edge-disjoint paths a load level based on the load level of a node in the path having the lowest nonzero load level.

9. The method according to claim 1, wherein in the set of paths (S), paths between the root node (R) and one of the plurality of the other non-root nodes in the directed graph are edge-disjoint.

10. A system for testing a navigation graph service comprising:
    a memory storing instructions; and
    one or more hardware processors configured to execute the instructions to:
    provide a directed graph based on the navigation graph service, wherein nodes of the directed graph are associated with load levels;
    determine a set of paths (S) between a root node (R) in the directed graph and a plurality of other non-root nodes in the directed graph based on the load levels associated with the nodes, wherein the determining comprises selecting a previously non-selected path (P) from a set of edge-disjoint paths between the R and a node X in the directed graph that is associated with a lowest nonzero and a positive load level (L), and adding the P to the set of the paths (S), wherein the load level of each node in the P is reduced by L/K, wherein ties between the nodes are arbitrarily resolved, wherein the number of determined edge-disjoint paths is the K, and wherein each path in the set of paths (S) corresponds to an edge-disjoint path between the R and one of the plurality of the other non-root node in the directed graph;
    generate a testing script for an arbitrary performance testing tool based on the set of paths (S); and
    execute the testing script using the arbitrary performance testing tool.

11. The system according to claim 10, wherein the selection of P is repeated until K paths are added to the set of paths (S).

12. The system according to claim 11, wherein the step of determining the S is repeated until every node in the directed graph besides the root node (R) has a load level of zero.

13. The system according to claim 10, wherein the directed graph is validated by checking that all nodes in the directed graph are connected and that a path exists between the root note (R) and each non-root node in the plurality of the other non-root nodes.

14. The system according to claim 10, wherein the navigation graph service comprises a website, and the nodes of the directed graph correspond to pages of the website.

15. The system according to claim 10, wherein the navigation graph service comprises an application, and the nodes of the directed graph correspond to views of the application.

16. The system according to claim 10, wherein each path in the set of the paths (S) has at most N loops, wherein N ranges from 0 to 10.

17. A non-transitory computer-readable medium storing instructions for testing a navigation graph service, wherein upon execution of the instructions by one or more hardware processors, the one or more hardware processors are configured by the instructions to:
provide a directed graph based on the navigation graph service, wherein nodes of the directed graph are associated with load levels;
determine a set of paths (S) between a root node (R) in the directed graph and a plurality of other non-root nodes in the directed graph based on the load levels associated with the nodes, wherein the determining comprises selecting a previously non-selected path (P) from a set of edge-disjoint paths between the R and a node X in the directed graph that is associated with a lowest nonzero and a positive load level (L), and adding the P to the set of the paths (S), wherein the load level of each node in the P is reduced by L/K, wherein ties between the nodes are arbitrarily resolved, wherein the number of determined edge-disjoint paths is the K, and wherein each path in the set of paths (S) corresponds to an edge-disjoint path between the R and one of the plurality of the other non-root node in the directed graph;
generate a testing script for an arbitrary performance testing tool based on the set of paths (S); and
execute the testing script using the arbitrary performance testing tool.

18. The non-transitory computer-readable medium according to claim 17, wherein the selection of P is repeated until K paths are added to the set of paths (S).

19. The non-transitory computer-readable medium according to claim 18, wherein the step of determining the S is repeated until every node in the directed graph besides the root node (R) has a load level of zero.

20. The non-transitory computer-readable medium according to claim 17, wherein the navigation graph service comprises a website, and the nodes of the directed graph correspond to pages of the website.

21. The non-transitory computer-readable medium according to claim 17, wherein the navigation graph service comprises an application, and the nodes of the directed graph correspond to views of the application.

22. The non-transitory computer-readable medium according to claim 17, wherein each path in the set of the paths (S) has at most N loops, wherein N ranges from 0 to 10.

* * * * *